United States Patent
Faitelson et al.

(10) Patent No.: US 9,679,148 B2
(45) Date of Patent: *Jun. 13, 2017

(54) ACCESS PERMISSIONS MANAGEMENT SYSTEM AND METHOD

(71) Applicant: VARONIS SYSTEMS, INC., New York, NY (US)

(72) Inventors: Yakov Faitelson, Elkana (IL); Ohad Korkus, Herzeliya (IL); Ophir Kretzer-Katzir, Reut (IL)

(73) Assignee: VARONIS SYSTEMS, INC., New York, NY (US)

( * ) Notice: Subject to any disclaimer, the term of this patent is extended or adjusted under 35 U.S.C. 154(b) by 234 days.

This patent is subject to a terminal disclaimer.

(21) Appl. No.: 14/508,390

(22) Filed: Oct. 7, 2014

(65) Prior Publication Data
US 2015/0026778 A1    Jan. 22, 2015

Related U.S. Application Data

(63) Continuation of application No. 13/303,826, filed on Nov. 23, 2011, now Pat. No. 8,909,673, which is a (Continued)

(51) Int. Cl.
*G06F 17/30* (2006.01)
*G06F 21/60* (2013.01)

(52) U.S. Cl.
CPC ...... *G06F 21/604* (2013.01); *G06F 17/30091* (2013.01); *G06F 17/30165* (2013.01); *G06F 17/30203* (2013.01)

(58) Field of Classification Search
None
See application file for complete search history.

(56) References Cited

U.S. PATENT DOCUMENTS

| 5,465,387 A | 11/1995 | Mukherjee |
| 5,761,669 A * | 6/1998 | Montague ............. G06F 21/604 |
| | | 707/758 |

(Continued)

FOREIGN PATENT DOCUMENTS

| CN | 1588889 A | 3/2005 |
| CN | 101316273 A | 12/2008 |

(Continued)

OTHER PUBLICATIONS

DatAdvantage User Guide by Varonis, Version 1.0, Aug. 30, 2005, 71 pages.

(Continued)

*Primary Examiner* — Son T Hoang
(74) *Attorney, Agent, or Firm* — Ladas & Parry LLP

(57) ABSTRACT

In a hierarchical access permissions environment, a method for enabling efficient management of project-wise permissions including maintaining project-wise lists of network objects, access permissions to which cannot be managed together via a hierarchical folder structure and employing the project-wise lists of network objects to make project-wise changes in access permissions to the network objects without the need to individually modify access permissions to individual ones of the network objects.

16 Claims, 12 Drawing Sheets

Related U.S. Application Data continuation-in-part of application No. 13/014,762, filed on Jan. 27, 2011, now Pat. No. 8,805,884, and a continuation-in-part of application No. 13/106,023, filed on May 12, 2011, now Pat. No. 8,533,787, and a continuation-in-part of application No. 13/159,903, filed on Jun. 14, 2011.

(60) Provisional application No. 61/477,662, filed on Apr. 21, 2011.

(56) References Cited

U.S. PATENT DOCUMENTS

| | | | |
|---|---|---|---|
| 5,889,952 A | 3/1999 | Hunnicutt et al. | |
| 5,899,991 A | 5/1999 | Karch | |
| 6,308,173 B1 | 10/2001 | Glasser et al. | |
| 6,338,082 B1 | 1/2002 | Schneider | |
| 6,393,468 B1 | 5/2002 | McGee | |
| 6,772,350 B1 | 8/2004 | Belani et al. | |
| 6,928,439 B2 | 8/2005 | Satoh | |
| 7,007,032 B1 | 2/2006 | Chen et al. | |
| 7,017,183 B1 | 3/2006 | Frey et al. | |
| 7,031,984 B2 | 4/2006 | Kawamura et al. | |
| 7,068,592 B1 | 6/2006 | Duvaut et al. | |
| 7,305,562 B1 | 12/2007 | Bianco et al. | |
| 7,403,925 B2 | 7/2008 | Schlesinger et al. | |
| 7,421,740 B2 | 9/2008 | Fey et al. | |
| 7,555,482 B2 | 6/2009 | Korkus | |
| 7,606,801 B2 | 10/2009 | Faitelson et al. | |
| 7,716,240 B2 | 5/2010 | Lim | |
| 7,743,420 B2 | 6/2010 | Shulman et al. | |
| 8,447,829 B1 | 5/2013 | Geller et al. | |
| 8,533,787 B2 | 9/2013 | Faitelson et al. | |
| 8,805,884 B2 | 8/2014 | Faitelson et al. | |
| 8,909,673 B2 | 12/2014 | Faitelson et al. | |
| 2002/0002557 A1 | 1/2002 | Straube et al. | |
| 2002/0026592 A1* | 2/2002 | Gavrila | G06F 21/6218 726/6 |
| 2003/0051026 A1 | 3/2003 | Carter et al. | |
| 2003/0188198 A1 | 10/2003 | Holdsworth et al. | |
| 2004/0030915 A1 | 2/2004 | Sameshima et al. | |
| 2004/0186809 A1 | 9/2004 | Schlesinger et al. | |
| 2004/0249847 A1 | 12/2004 | Wang et al. | |
| 2004/0254919 A1 | 12/2004 | Giuseppini | |
| 2005/0044396 A1 | 2/2005 | Vogel et al. | |
| 2005/0044399 A1 | 2/2005 | Dorey | |
| 2005/0065823 A1 | 3/2005 | Ramraj et al. | |
| 2005/0086529 A1 | 4/2005 | Buchsbaum | |
| 2005/0108206 A1 | 5/2005 | Lam et al. | |
| 2005/0120054 A1 | 6/2005 | Shulman et al. | |
| 2005/0203881 A1 | 9/2005 | Sakamoto et al. | |
| 2005/0246762 A1 | 11/2005 | Girouard et al. | |
| 2005/0278334 A1 | 12/2005 | Fey et al. | |
| 2005/0278785 A1 | 12/2005 | Lieberman | |
| 2006/0037062 A1* | 2/2006 | Araujo | H04L 63/20 726/2 |
| 2006/0064313 A1 | 3/2006 | Steinbarth et al. | |
| 2006/0090208 A1 | 4/2006 | Smith | |
| 2006/0184459 A1 | 8/2006 | Parida | |
| 2006/0184530 A1 | 8/2006 | Song et al. | |
| 2006/0271523 A1 | 11/2006 | Brookler et al. | |
| 2006/0277184 A1 | 12/2006 | Faitelson et al. | |
| 2006/0294578 A1* | 12/2006 | Burke | G06F 21/604 726/2 |
| 2007/0033340 A1 | 2/2007 | Tulskie et al. | |
| 2007/0073698 A1 | 3/2007 | Kanayama et al. | |
| 2007/0094265 A1 | 4/2007 | Korkus | |
| 2007/0101387 A1 | 5/2007 | Hua et al. | |
| 2007/0112743 A1 | 5/2007 | Giampaolo et al. | |
| 2007/0156659 A1 | 7/2007 | Lim | |
| 2007/0156693 A1 | 7/2007 | Soin et al. | |
| 2007/0198608 A1 | 8/2007 | Prahlad et al. | |
| 2007/0203872 A1 | 8/2007 | Flinn et al. | |
| 2007/0214497 A1 | 9/2007 | Montgomery et al. | |
| 2007/0244899 A1 | 10/2007 | Faitelson et al. | |
| 2007/0261121 A1 | 11/2007 | Jacobson | |
| 2007/0266006 A1 | 11/2007 | Buss | |
| 2007/0276823 A1 | 11/2007 | Borden et al. | |
| 2007/0282855 A1 | 12/2007 | Chen et al. | |
| 2008/0031447 A1 | 2/2008 | Geshwind et al. | |
| 2008/0034402 A1 | 2/2008 | Botz et al. | |
| 2008/0162707 A1 | 7/2008 | Beck et al. | |
| 2008/0172720 A1 | 7/2008 | Botz et al. | |
| 2008/0270462 A1 | 10/2008 | Thomsen | |
| 2008/0271157 A1 | 10/2008 | Faitelson et al. | |
| 2009/0100058 A1 | 4/2009 | Faitelson et al. | |
| 2009/0119298 A1 | 5/2009 | Faitelson et al. | |
| 2009/0150981 A1 | 6/2009 | Amies et al. | |
| 2009/0198892 A1 | 8/2009 | Alvarez et al. | |
| 2009/0249446 A1 | 10/2009 | Jenkins et al. | |
| 2009/0265780 A1 | 10/2009 | Korkus et al. | |
| 2009/0320088 A1 | 12/2009 | Gill et al. | |
| 2010/0037324 A1 | 2/2010 | Grant et al. | |
| 2010/0070881 A1 | 3/2010 | Hanson et al. | |
| 2010/0262625 A1 | 10/2010 | Pittenger | |
| 2011/0060916 A1 | 3/2011 | Faitelson et al. | |
| 2011/0061093 A1 | 3/2011 | Korkus et al. | |
| 2011/0061111 A1 | 3/2011 | Faitelson et al. | |
| 2011/0184989 A1 | 7/2011 | Faitelson et al. | |
| 2011/0296490 A1 | 12/2011 | Faitelson et al. | |
| 2012/0054283 A1 | 3/2012 | Korkus et al. | |
| 2012/0078965 A1* | 3/2012 | Laitkorpi | G06F 21/6218 707/785 |
| 2012/0271853 A1 | 10/2012 | Faitelson et al. | |
| 2012/0271855 A1 | 10/2012 | Faitelson et al. | |
| 2012/0291100 A1 | 11/2012 | Faitelson et al. | |

FOREIGN PATENT DOCUMENTS

| | | |
|---|---|---|
| JP | 2005-267237 A | 9/2005 |
| JP | 2010-287171 A | 12/2010 |
| WO | 2011/030324 A1 | 3/2011 |
| WO | 2011/148376 A2 | 12/2011 |
| WO | 2011/148377 A1 | 12/2011 |

OTHER PUBLICATIONS

DatAdvantage User Guide by Varonis, Version 2.0, Aug. 24, 2006, 118 pages.

DatAdvantage User Guide by Varonis, Version 2.5, Nov. 27, 2006, 124 pages.

DatAdvantage User Guide by Varonis, Version 2.6, Dec. 15, 2006, 127 pages.

DatAdvantage User Guide by Varonis, Version 2.7, Feb. 6, 2007, 131 pages.

DatAdvantage User Guide by Varonis, Version 3.0, Jun. 20, 2007, 153 pages.

List of database tables in DatAdvantage 2.7, Feb. 6, 2007.

List of database tables in DatAdvantage 3.0, Jun. 20, 2007.

List of all the Versions of the DatAdvantage Product and User Guide by Varonis, Jun. 20, 2007.

Sahadeb DE, et al; "Secure Access Control in a Multi-user Geodatabase", available on the Internet at the URL http://www10.giscafe.com.2005.

FINDUTILS-GNU Project; Free Software Foundation (FSF), 3 pages, Nov. 2006.

Genunix; "Writing Filesystems—VFS and Vnode interfaces", From Genunix; 5 pages, Oct. 2007.

S.R. Kleiman; "Vnodes: An Architecture for Multiple File System Types in Sun UNIX", USENIX Association: Summer Conference Proceedings, Atlanta 1986.

Sara C. Madeira, et al; "Biclustering Algorithms for Biological Data Analysis: A Survey", IEEE Transactions on Computational Biology and Bioinformatics, vol. 1, No. 1, Jan.-Mar. 2004, 22 pages.

Sara C. Madeira: "Clustering, Fuzzy Clustering and Biclustering: An Overview", pp. 31 to 53, Jun. 27, 2003.

Alex Woodie; "Varonis Prevents Unauthorized Access to Unstructured Data", Four Hundred Stuff, vol. 7, No. 29, Jul. 31, 2007, 4 pages.

(56) References Cited

OTHER PUBLICATIONS

Varonis: "Accelerating Audits with Automation: Understanding Who's Accessing Your Unstructured Data", By Varonis, Oct. 8, 2007, 7 pages.
Varonis: "The Business Case for Data Governance", By Varonis, dated Mar. 27, 2007; 8 pages.
International Preliminary Report on Patentability issued Jul. 30, 2013; PCT/IL2011/000902.
International Preliminary Report on Patentability issued Jul. 30, 2013; PCT/IL2011/000903.
International Search Report mailed May 23, 2011; PCT/IL2011/000065.
International Search Report and Written Opinion mailed May 20, 2010; PCT/IL10/00069.
International Search Report and Written Opinion dated Jun. 14, 2011; PCT/IL11/00066.
International Search Report and Written Opinion dated Jun. 13, 2011; PCT/IL11/00076.
International Search Report and Written Opinion dated May 24, 2011; PCT/IL11/00077.
International Search Report and Written Opinion dated Apr. 13, 2012; PCT/IL11/00902.
International Search Report and Written Opinion dated Nov. 15, 2011 PCT/IL11/00408.
International Search Report and Written Opinion dated Aug. 31, 2012 PCT/IL2012/000163.
U.S. Appl. No. 60/688,486, filed Jun. 7, 2005.
U.S. Appl. No. 12/673,691, filed Feb. 16, 2010.
U.S. Appl. No. 61/477,662, filed Apr. 21, 2011.
USPTO NFOA mailed Feb. 12, 2008 in connection with U.S. Appl. No. 11/258,256.
USPTO FOA mailed Aug. 1, 2008 in connection with U.S. Appl. No. 11/258,256.
USPTO NFOA mailed Oct. 31, 2008 in connection with U.S. Appl. No. 11/635,736.
USPTO NFOA mailed Dec. 14, 2010 in connection with U.S. Appl. No. 11/786,522.
USPTO NFOA mailed Jul. 9, 2010 in connection with U.S. Appl. No. 11/789,884.
USPTO NFOA mailed Dec. 14, 2010 in connection with U.S. Appl. No. 11/789,884.
USPTO NOA mailed Apr. 12, 2012 in connection with U.S. Appl. No. 11/789,884.
USPTO NFOA dated Sep. 16, 2010 in connection with U.S. Appl. No. 11/871,028.
USPTO FOA dated Apr. 28, 2011 in connection with U.S. Appl. No. 11/871,028.
USPTO NFOA dated Sep. 14, 2012 in connection with U.S. Appl. No. 12/861,967.
USPTO NFOA dated Jul. 11, 2012 in connection with U.S. Appl. No. 13/014,762.
USPTO RR dated Nov. 21, 2012 in connection with U.S. Appl. No. 13/106,023.
USPTO NFOA dated Jan. 15, 2013 in connection with U.S. Appl. No. 13/159,903.
USPTO NFOA dated Mar. 13, 2014 in connection with U.S. Appl. No. 13/159,903.
USPTO NFOA dated Sep. 19, 2012 in connection with U.S. Appl. No. 13/303,826.
USPTO FOA dated Mar. 25, 2013 in connection with U.S. Appl. No. 13/303,826.
USPTO NFOA dated Jun. 4, 2014 in connection with U.S. Appl. No. 13/303,826.
USPTO NOA mailed Jul. 11, 2014 in connection with U.S. Appl. No. 13/303,826.
USPTO FOA dated Sep. 6, 2013 in connection with U.S. Appl. No. 13/378,115.
USPTO NFOA dated Jul. 8, 2014 in connection with U.S. Appl. No. 13/378,115.
Ebell: "Access Control Lists—alfrescowiki", Jun. 5, 2008 (Jun. 5, 2008), XP055268315, Retrieved from the Internet URL:https://wiki.alfresco.com/index.php7ti tle=Access_Control_Li sts&oldi d=19082.
Dennis Lu et al. "Jesse Dyer", Jul. 15, 2004 (Jul. 15, 2004), XP055268358, Retrieved from the Internet: URL:https://web.archive.org/web/20040715000000*/http://www.owlnet.rice.edu/~welsh/comp527/comp527_Final_Report.doc.
Extended European Search Report dated May 3, 2016, Appln. No. 12774249.2-1870/2700028 PCT/IL2012000163.
First Chinese Office Action dated Jun. 29, 2016; Appln. No. 2012800293603 (In English).

* cited by examiner

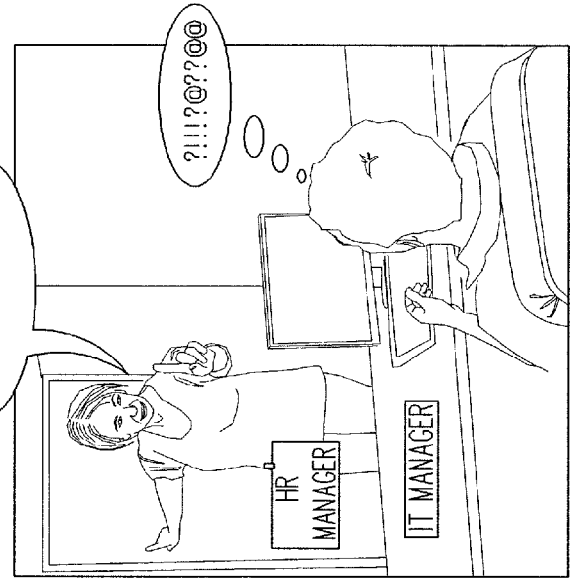
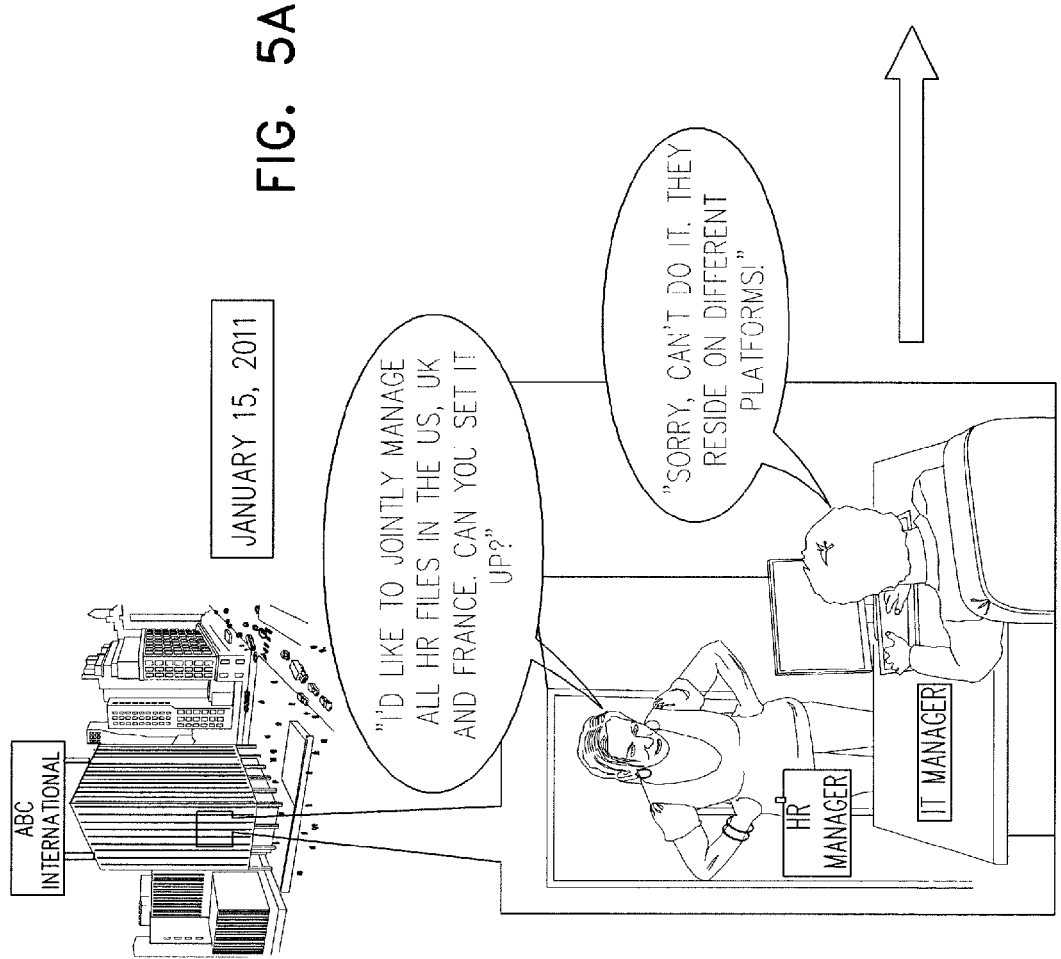
FIG. 5A

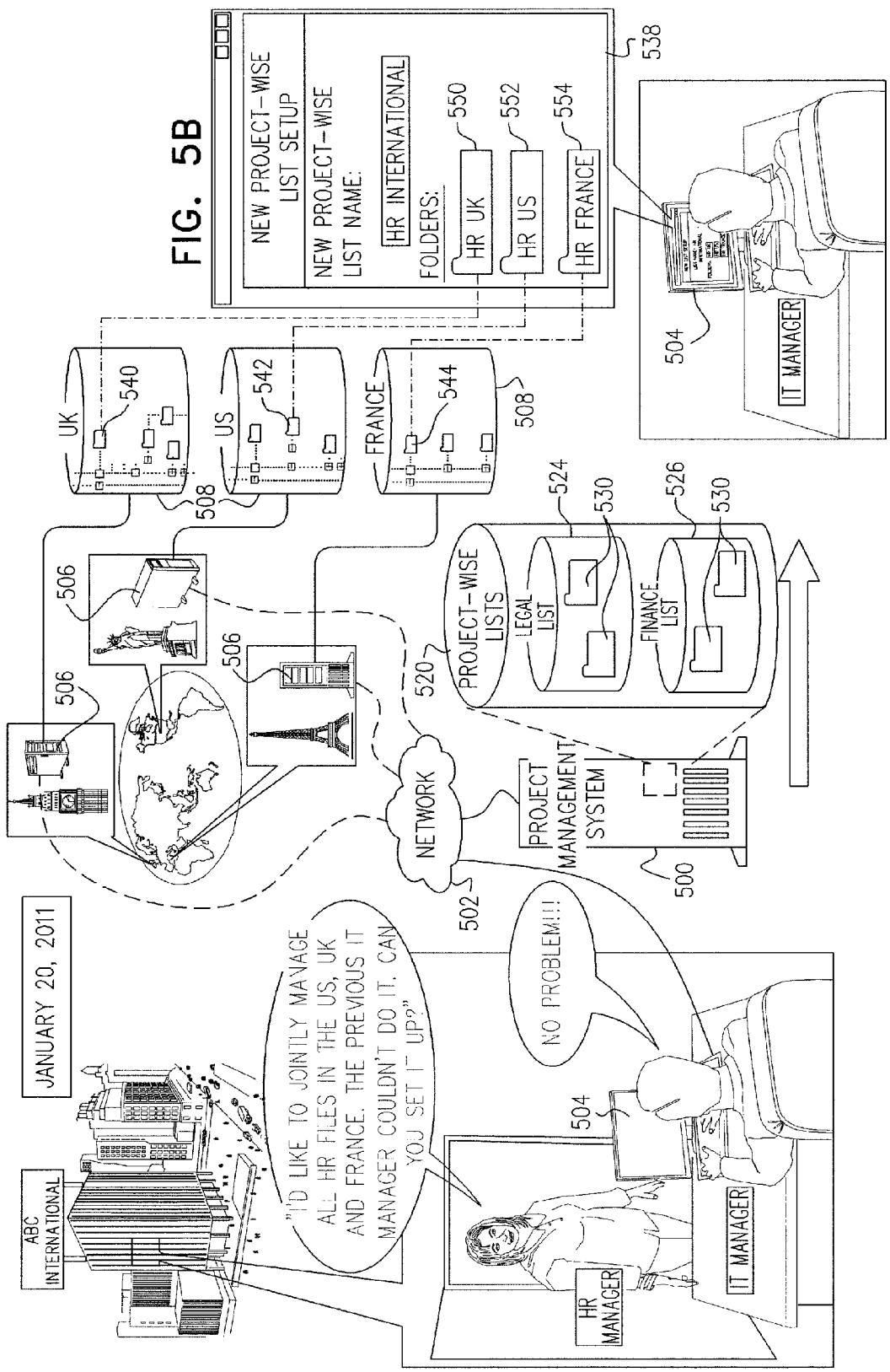

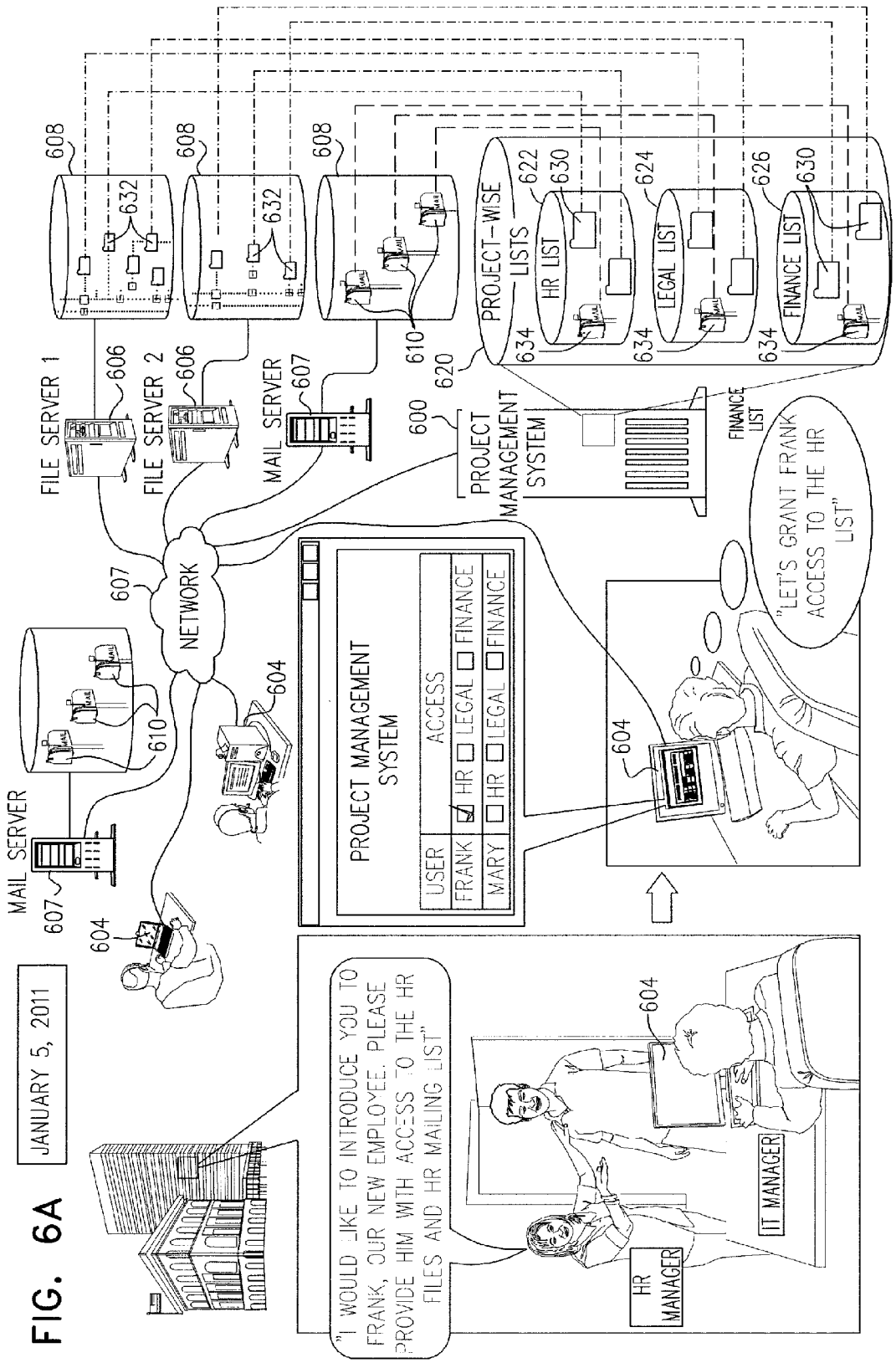

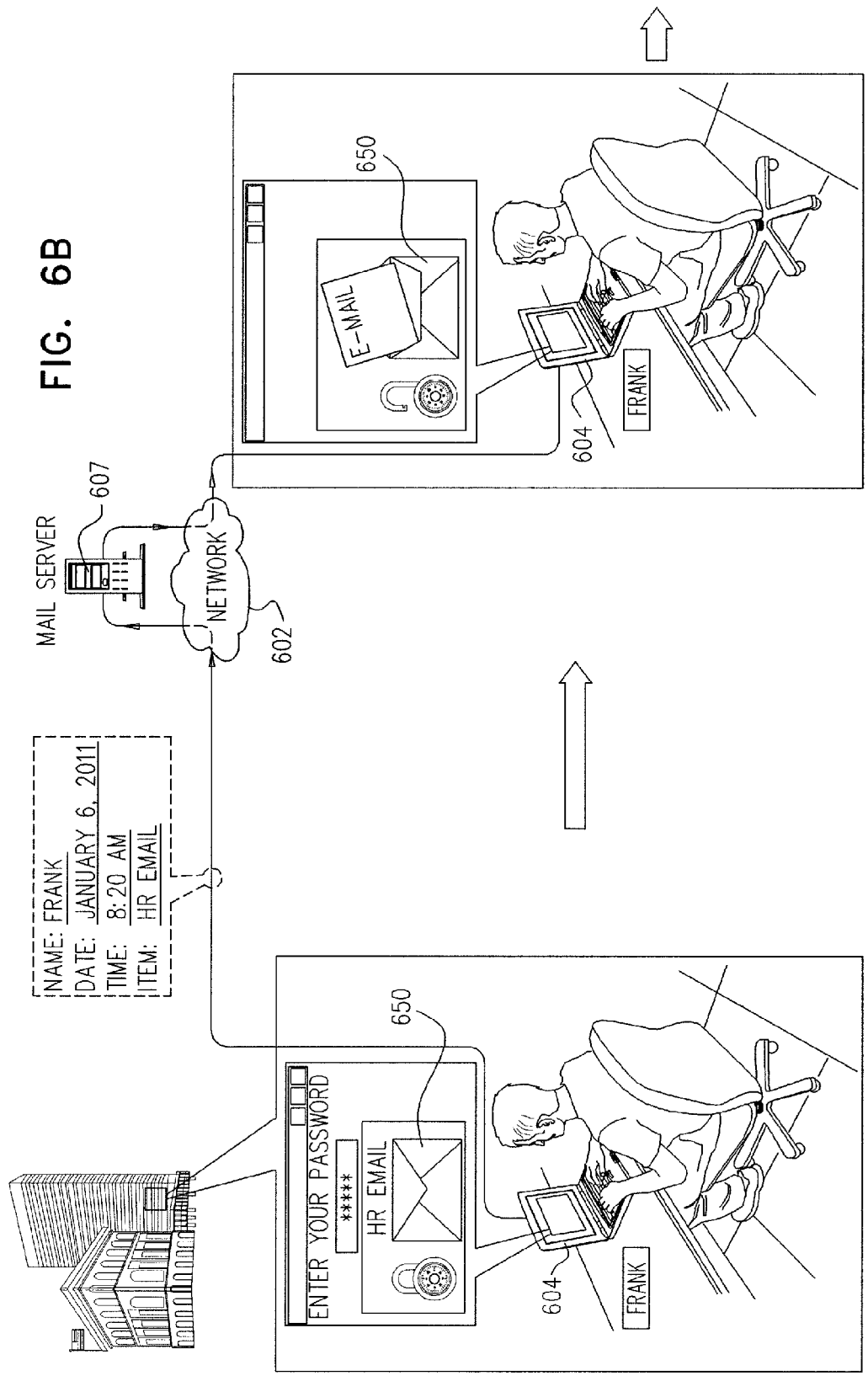

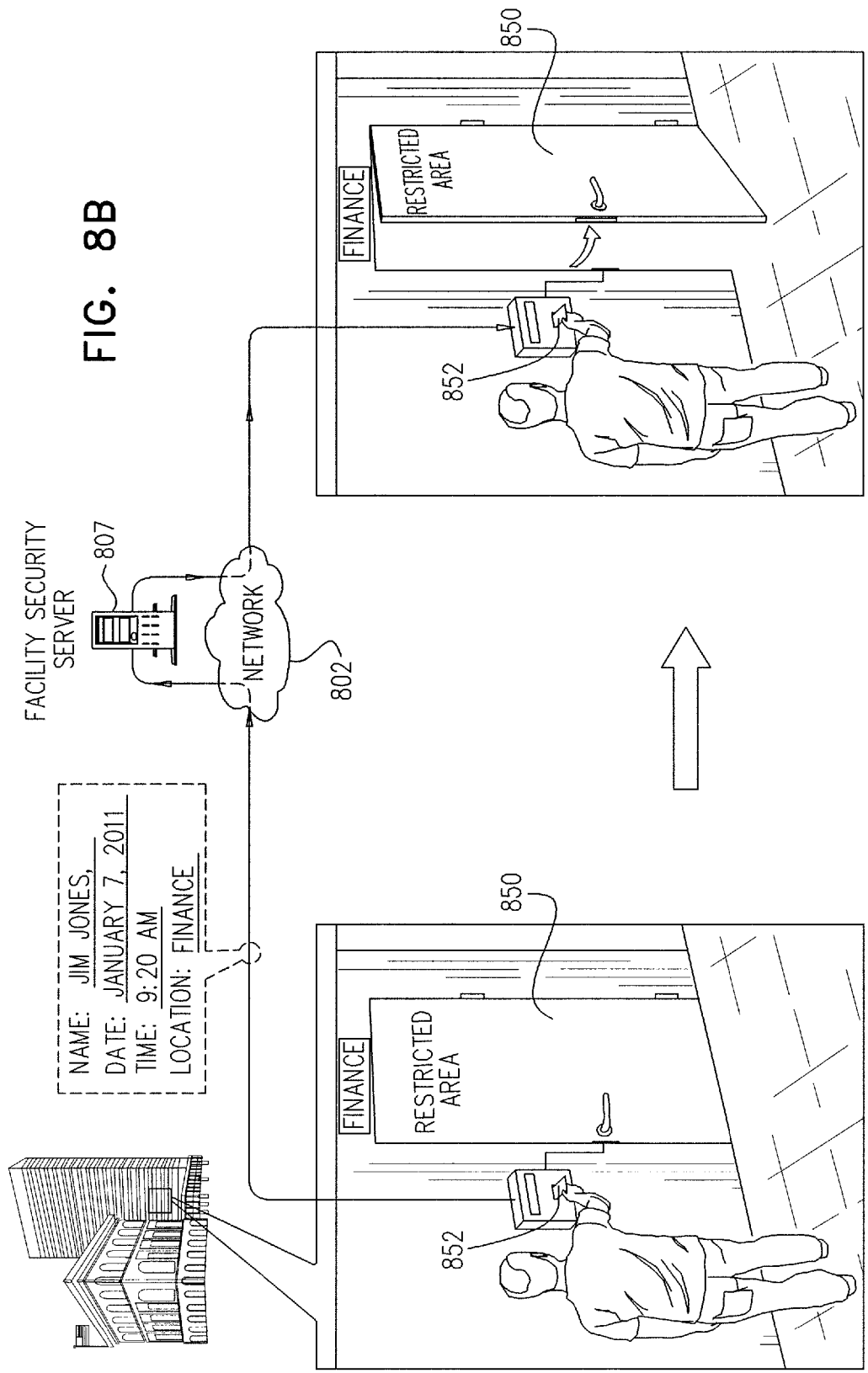

ACCESS PERMISSIONS MANAGEMENT SYSTEM AND METHOD

REFERENCE TO RELATED APPLICATIONS

Reference is made to U.S. patent application Ser. No. 13/014,762, filed Jan. 27, 2011, and entitled "AUTOMATIC RESOURCE OWNERSHIP ASSIGNMENT SYSTEMS AND METHODS", the disclosure of which is hereby incorporated by reference and priority of which is hereby claimed pursuant to 37 CFR 1.78(a) (1) and (2)(i).

Reference is also made to U.S. Provisional Patent Application Ser. No. 61/477,662, filed Apr. 21, 2011 and entitled "ACCESS PERMISSIONS MANAGEMENT SYSTEM AND METHOD", the disclosure of which is hereby incorporated by reference and priority of which is hereby claimed pursuant to 37 CFR 1.78(a) (4) and (5)(i).

Reference is also made to U.S. patent application Ser. No. 13/106,023, filed May 12, 2011, and entitled "AUTOMATIC RESOURCE OWNERSHIP ASSIGNMENT SYSTEM AND METHOD", the disclosure of which is hereby incorporated by reference and priority of which is hereby claimed pursuant to 37 CFR 1.78(a) (1) and (2)(i).

Reference is also made to U.S. patent application Ser. No. 13/159,903, filed Jun. 14, 2011, and entitled "ACCESS PERMISSIONS MANAGEMENT SYSTEM AND METHOD", the disclosure of which is hereby incorporated by reference and priority of which is hereby claimed pursuant to 37 CFR 1.78(a) (1) and (2)(i).

Reference is also made to the following patents and patent applications, owned by assignee, the disclosures of which are hereby incorporated by reference:

U.S. Pat. Nos. 7,555,482 and 7,606,801;

U.S. Published Patent Application Nos. 2007/0244899, 2008/0271157, 2009/0100058, 2009/0119298; 2009/0265780; 2011/0010758; 2011/0060916; 2011/0061093; 2011/0061111 and 2011/0184989;

U.S. patent application Ser. Nos. 12/861,059; 12/861,953; 13/106,023 and 13/159,903; and PCT Applications PCT/IL2011/000409 and PCT/IL2011/000408.

FIELD OF THE INVENTION

The present invention relates to data management generally and more particularly access permissions management.

BACKGROUND OF THE INVENTION

The following patent publications are believed to represent the current state of the art:

U.S. Pat. Nos. 5,465,387; 5,899,991; 6,338,082; 6,393,468; 6,928,439; 7,031,984; 7,068,592; 7,403,925; 7,421,740; 7,555,482, 7,606,801 and 7,743,420; and U.S. Published Patent Application Nos.: 2003/0051026; 2004/0249847; 2005/0108206; 2005/0203881; 2005/0086529; 2006/0064313; 2006/0184530; 2006/0184459; 2007/0203872; 2007/0244899; 2008/0271157; 2009/0100058; 2009/0119298 and 2009/0265780.

SUMMARY OF THE INVENTION

The present invention provides improved systems and methodologies for access permissions management.

There is thus provided in accordance with a preferred embodiment of the present invention in a hierarchical access permissions environment, a method for enabling efficient management of project-wise permissions including maintaining project-wise lists of network objects, access permissions to which cannot be managed together via a hierarchical folder structure and employing the project-wise lists of network objects to make project-wise changes in access permissions to the network objects without the need to individually modify access permissions to individual ones of the network objects.

In accordance with a preferred embodiment of the present invention maintaining project-wise lists of network objects includes generating at least one project-wise list of plural ones of the network objects. Preferably, maintaining project-wise lists of network objects also includes mapping access permissions of the plural ones of the network objects onto the at least one project-wise list. Preferably, maintaining project-wise lists of network objects also includes merging access permissions of plural ones of first network objects of a first project-wise list with access permissions of corresponding plural ones of second network objects of a second project-wise list.

In accordance with a preferred embodiment of the present invention the network objects are stored on disparate computers. In accordance with a preferred embodiment of the present invention at least some of the disparate computers are operated by different computer operating systems. In accordance with a preferred embodiment of the present invention the network objects include inter-related subject matter.

Preferably, the network objects are owned by a common owner.

There is also provided in accordance with another preferred embodiment of the present invention in a hierarchical access permissions environment, a project management system for enabling efficient management of project-wise permissions including a project-wise lists management (PWLM) subsystem maintaining project-wise lists of network objects, access permissions to which cannot be managed together via a hierarchical folder structure and a user interface allowing an owner of a project-wise list of network objects to make project-wise changes in access permissions to the network objects without the need to individually modify access permissions to individual ones of the network objects.

In accordance with a preferred embodiment of the present invention the project-wise lists management (PWLM) subsystem includes a project-wise list generator which generates at least one project-wise list of plural ones of the network objects. Preferably, the project-wise lists management (PWLM) subsystem also includes an access permissions mapping generator which maps access permissions of the plural ones of the network objects onto the at least one project-wise list. Preferably, the project-wise lists management (PWLM) subsystem also includes project-wise lists merging functionality which is operative to merge access permissions of plural ones of first network objects of a first project-wise list with access permissions of corresponding plural ones of second network objects of a second project-wise list.

In accordance with a preferred embodiment of the present invention the network objects are stored on disparate computers. In accordance with a preferred embodiment of the present invention at least some of the disparate computers are operated by different computer operating systems. In accordance with a preferred embodiment of the present invention the network objects include inter-related subject matter.

Preferably, the network objects are owned by a common owner.

BRIEF DESCRIPTION OF THE DRAWINGS

The present invention will be understood and appreciated more fully from the following detailed description, taken in conjunction with the drawings in which:

FIGS. 5A and 5B are simplified pictorial illustrations of yet another example of the system for enabling efficient management of project-wise permissions, constructed and operative in accordance with a preferred embodiment of the present invention;

FIGS. 6A and 6B are simplified pictorial illustrations of still another example of the use of the system for enabling efficient management of project-wise permissions, constructed and operative in accordance with a preferred embodiment of the present invention;

FIGS. 8A and 8B are simplified pictorial illustrations of still another example of the use of the system for enabling efficient management of project-wise permissions, constructed and operative in accordance with a preferred embodiment of the present invention.

DETAILED DESCRIPTION OF PREFERRED EMBODIMENTS

Figure 1:
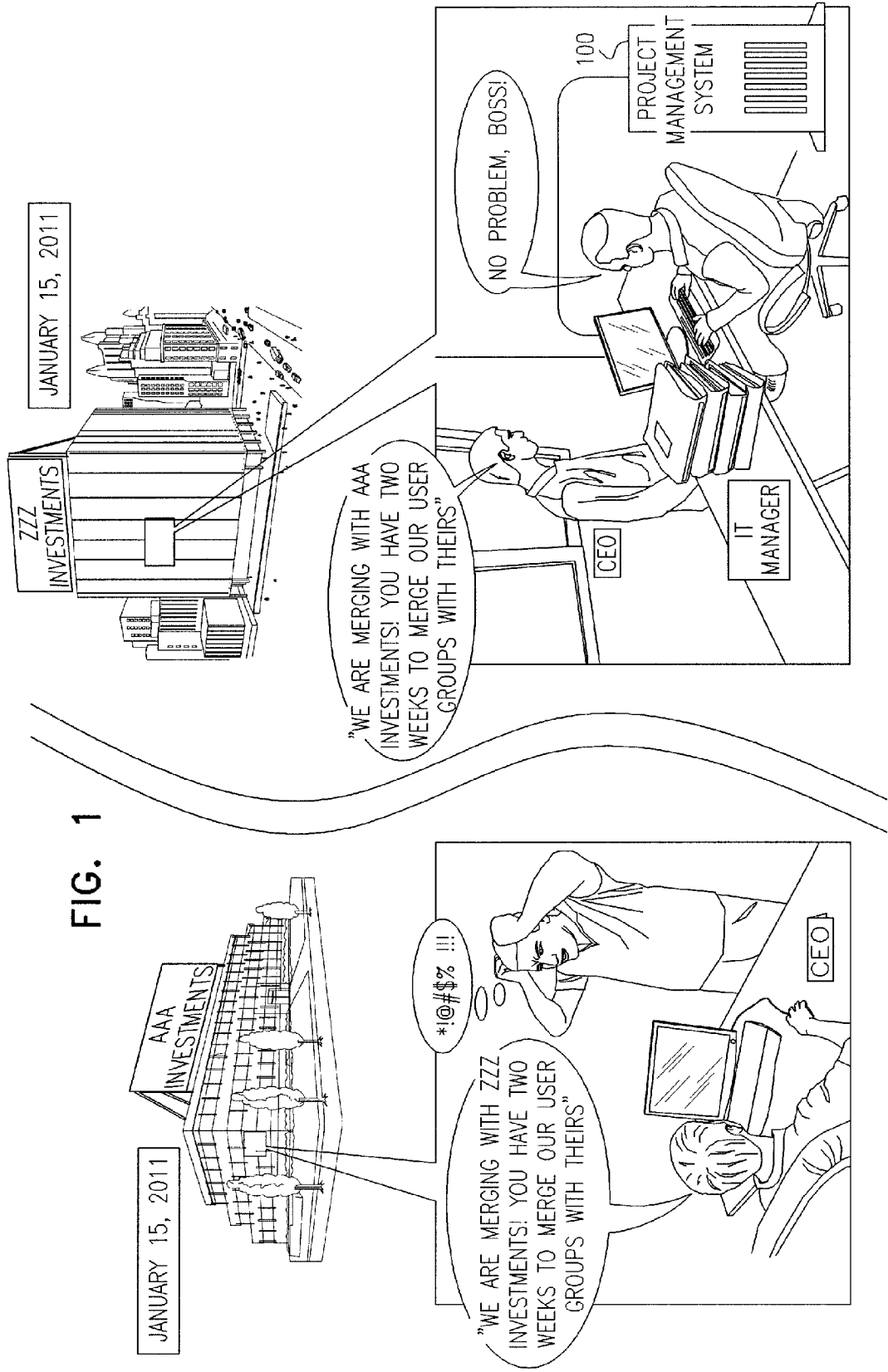
FIG. 1 is a simplified pictorial illustration of one example of the use of a system for enabling efficient management of project-wise permissions, constructed and operative in accordance with a preferred embodiment of the present invention.

Reference is now made to FIG. 1, which is a simplified pictorial illustration of the use of a project management system for enabling efficient management of project-wise permissions, constructed and operative in accordance with a preferred embodiment of the present invention. This system is preferably suitable for operating in an hierarchical access permissions environment such as an enterprise computer network including multiple network objects, and includes a project-wise lists management (PWLM) subsystem maintaining project-wise lists of network objects, access permissions to which cannot be managed together via a hierarchical folder structure, and a user interface allowing an owner of a project-wise list of network objects to make project-wise changes in access permissions to the network objects without the need to individually modify access permissions to individual ones of the network objects.

The term "network object" for the purposes of this application is defined to include user generated enterprise computer network resources on any commercially available computer operating system. Examples of network objects include structured and unstructured computer data resources such as files and folders, mailboxes and mailing lists, disparate users, user groups and collections of user groups, and physical resources controlled by an enterprise computer network such as doors, parking lots and elevators.

As shown in FIG. 1, on a particular date such as Jan. 15, 2011, a CEO of a first company informs the IT manager of the company of an imminent merge with a second company, and requests that the IT manager merge the user groups of the two companies within two weeks. In response, the IT manager informs the CEO that he is unable to execute the merge.

As also shown in FIG. 1, the CEO of the second company informs the IT manager of the second company of the imminent merge with the first company, and requests that the IT manager merge the user groups of the two companies within two weeks. As seen in FIG. 1, the IT manager of the second company has access to a project management system 100. It is appreciated that project management system 100 is operative to make project-wise changes in access permissions to network objects without the need to individually access individual ones of the network objects.

Figure 2:
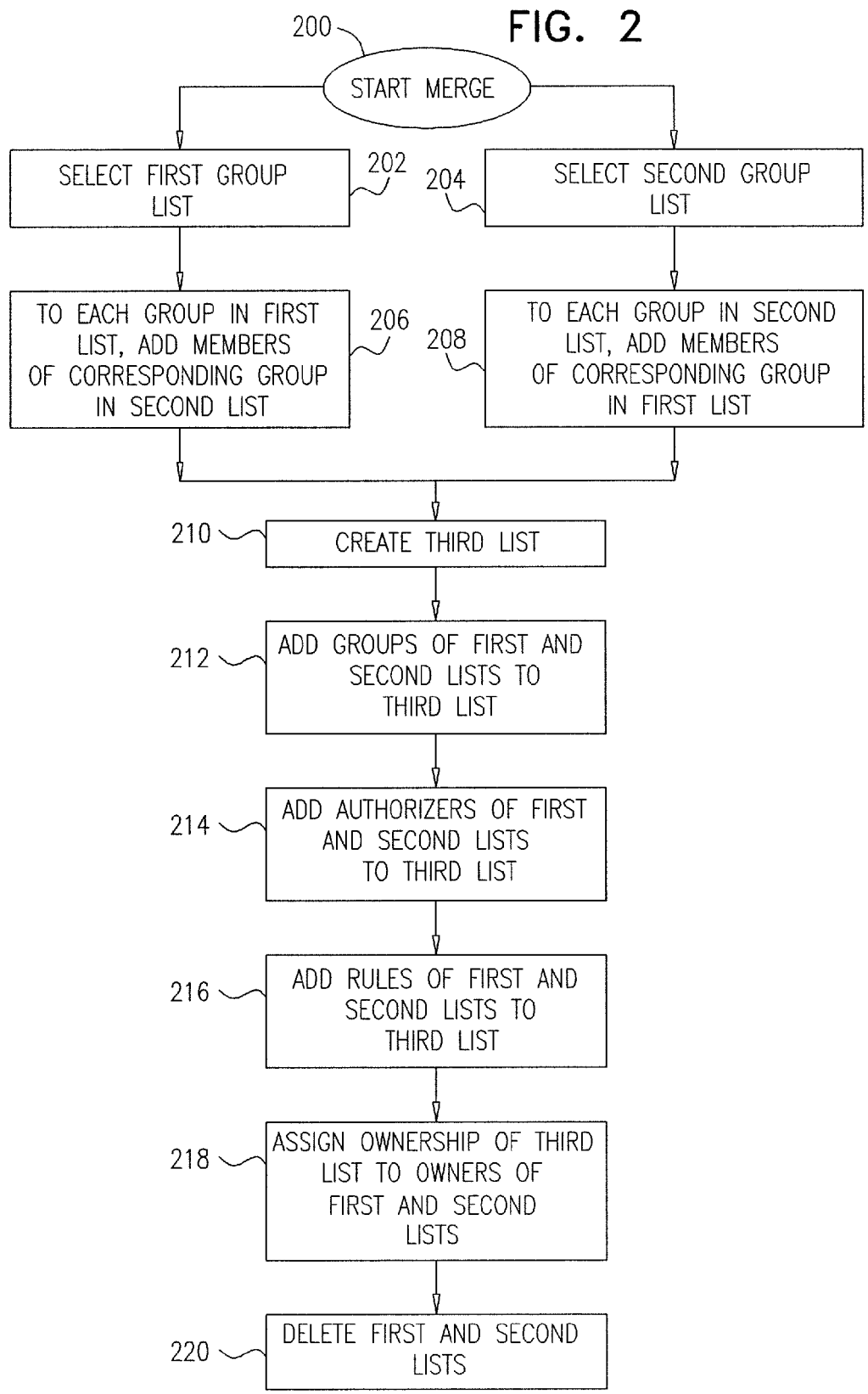
FIG. 2 is a simplified flowchart indicating steps in the operation of the system of FIG. 1.

Reference is now made to FIG. 2, which is a simplified flowchart indicating steps in the operation of the system of FIG. 1. The example of FIG. 2 illustrates the use of the project management system in merging corresponding user groups of two existing distinct lists of user groups into one new list of user groups, thereby enabling the users belonging to the groups of the two existing lists to be managed together.

As shown in FIG. 2, to initiate the merge (200), a user selects a first list of groups (202) and a second list of groups (204) to be merged. To each group in the first list, the system preferably adds the members of a corresponding group in the second list (206). Similarly, to each group in the second list, the system preferably adds the members of a corresponding group in the first collection (208).

The system then creates a third list of groups (210) and copies all groups of the first and second lists to the third list (212). Similarly, the system copies the authorizers of the first and second lists (214) and the rules of the first and second lists (216) to the third list. For the purposes of this application, "authorizers" are defined as users who have been granted limited management rights to a list, and "rules" are defined as a set of conditions under which users may be added or removed from a list.

Thereafter, the system assigns ownership of the third list to the owners of the first and second lists (218), and deletes the first and second lists (220).

Figure 3:
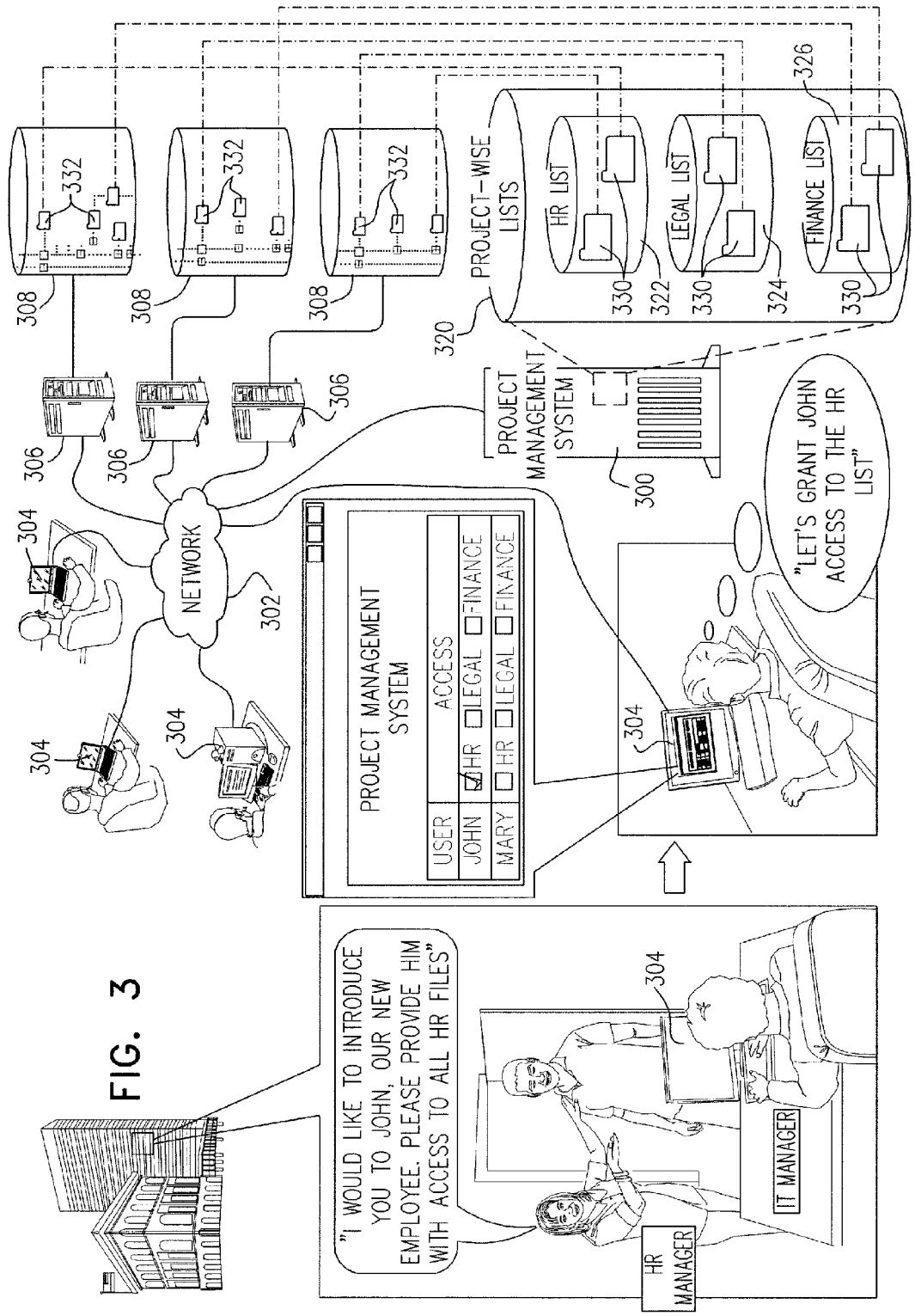
FIG. 3 is a simplified pictorial illustration of another example of the use of the system for enabling efficient management of project-wise permissions, constructed and operative in accordance with a preferred embodiment of the present invention.

Reference is now made to FIG. 3, which is a simplified pictorial illustration of another example of the use of the project management system for enabling efficient management of project-wise permissions, constructed and operative in accordance with a preferred embodiment of the present invention. This system is preferably suitable for operating in an hierarchical access permissions environment including multiple network objects, and includes functionality for maintaining project-wise lists of network objects, access permissions to which cannot be managed together via a hierarchical folder structure, and functionality for employing the project-wise lists of network objects to make project-wise changes in access permissions to the network objects without the need to individually access individual ones of the network objects.

As shown in FIG. 3, there is provided a project management system which typically resides on a server 300 that is connected to an enterprise-wide network 302. Network 302 preferably includes multiple disparate clients 304 and file servers 306. Each of file servers 306 preferably hosts a hierarchical folder structure 308 of folders and files.

The project management system residing on server 300 preferably comprises a projects repository 320 which contains a plurality of project-wise lists of links to network objects. In the example of FIG. 3, projects repository 320 includes a list of links to HR related folders 322, a list of links to legal related folders 324 and a list of links to finance related folders 326. Each of project-wise lists 322, 324 and 326 preferably comprises links 330 which reference actual folders 332 residing in any of hierarchical folder structures 308 hosted on file servers 306.

It is a particular feature of this embodiment of the present invention that although actual folders 332 referenced by links 330 in each of project-wise lists 322, 324 and 326 may each reside in any of hierarchical folder structures 308 hosted on disparate file servers 306, each of project-wise lists 322, 324 and 326 may be employed to make changes in access permissions to the folders referenced by links 330 thereof without the need to individually access individual ones of actual folders 332.

In the example of FIG. 3, an HR manager of a company introduces John, a new employee of the HR department, to the IT manager of the company, and requests that the IT manager grant John access permissions to all HR files in the organization. In response to the request made by the HR manager, the IT manager utilizes the project management system residing on server 300 to grant John permissions to the project-wise list of HR related folders 322, thereby granting John permissions to the portion of actual folders 332 which are HR related.

Figure 4:
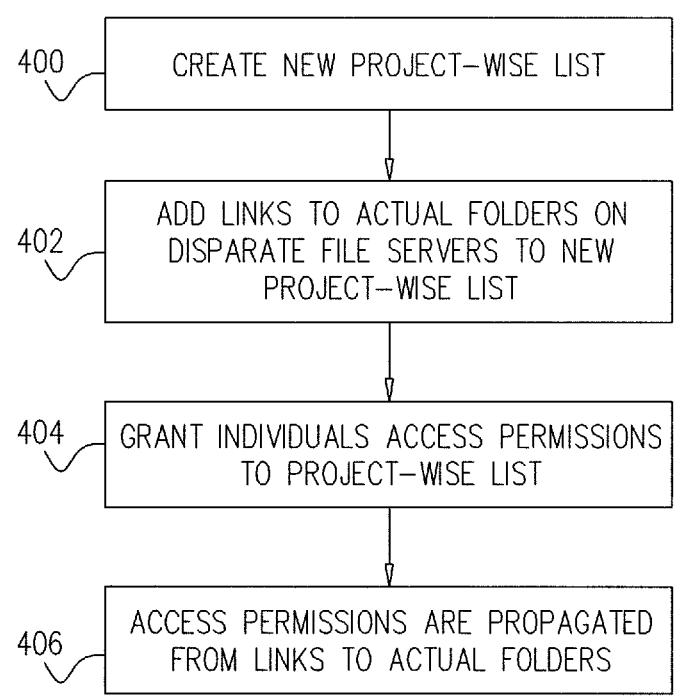
FIG. 4 is a simplified flowchart indicating steps in the operation of the system of FIG. 3.

Reference is now made to FIG. 4, which is a simplified flowchart indicating steps in the operation of the system of FIG. 3. The example of FIG. 4 illustrates the use of the project management system in modifying access permissions to folders residing on disparate file servers without the need to individually access individual ones of the folders.

As shown in FIG. 4, initially, a new project-wise list is created (400). Preferably, an owner of the new project-wise list then adds links to actual folders which preferably reside on disparate file servers to the new project-wise list (402). The owner can then grant access permissions to the new project-wise list to individuals (404). The access permissions granted to the new project-wise list are then propagated by the system to actual folders via the links (406), thereby granting actual access permissions to the actual folders to the individuals.

Reference is now made to FIGS. 5A and 5B, which are simplified pictorial illustrations of yet another example of the use of the project management system for enabling efficient management of project-wise permissions, constructed and operative in accordance with a preferred embodiment of the present invention. This system is preferably suitable for operating in an hierarchical access permissions environment including multiple network objects, and includes functionality for maintaining project-wise lists of network objects, access permissions to which cannot be managed together via a hierarchical folder structure, and functionality for employing the project-wise lists of network objects to make project-wise changes in access permissions to the network objects without the need to individually access individual ones of the network objects.

As shown in FIG. 5A on a particular date such as Jan. 15, 2011, an HR manager of a company requests an IT manager of the company to enable her to centrally manage HR related files and folders which reside on file servers hosted on diverse computer platforms located in disparate geographic locations. The IT manager informs the HR manager that the disparately located files and folders cannot be jointly managed as they reside on file servers hosted on diverse computer platforms. Responsive to the response of the IT manager, the HR manager terminates the employment of the IT manager at the company.

Turning now to FIG. 5B, it is shown that on a later date, such as on Jan. 20, 2011, the HR manager requests a newly hired IT manager of the company to enable her to centrally manage HR related files and folders which reside on file servers hosted on diverse computer platforms located in disparate geographic locations. The IT manager informs the HR manager that this can readily be achieved.

As shown in FIG. 5B, the IT manager has access to a project management system which typically resides on a server 500 that is connected to an enterprise-wide network 502. Network 502 preferably includes multiple disparate clients 504 and multiple disparate file servers 506 located in disparate geographic locations. Each of file servers 506 preferably hosts a hierarchical folder structure 508 of folders and files.

The project management system residing on server 500 preferably comprises a projects repository 520 which contains a plurality of project-wise lists of links to network objects. In the example of FIG. 5B, projects repository 520 includes a list of links to legal related folders 524 and a list of links to finance related folders 526. Each of lists 524 and 526 preferably comprises links 530 which reference actual folders residing in any of hierarchical folder structures 508 hosted on file servers 506.

As further shown in FIG. 5B, the IT manager employs the project management system residing on server 500 to create a new list of links to actual HR related folders 538 which folders reside on servers 506 located in disparate geographic locations. The IT manager selects an HR related folder in the United Kingdom 540, an HR related folder in the United States 542, and an HR related folder in France 544 and adds them to new list 538, thereby creating new corresponding links 550, 552 and 554. After completing the creation of new list 538, list 538 may be employed to centrally manage disparately located HR related folders 540, 542 and 544.

It is a particular feature of this embodiment of the present invention that although actual folders 540, 542 and 544 referenced by new list 538 may each reside in any of hierarchical folder structures 508 hosted on diverse computer platforms of disparate file servers 506, new list 538 may be employed to make changes in access permissions to the folders referenced thereby without the need to individually access individual ones of actual folders 540, 542 and 544.

Reference is now made to FIGS. 6A and 6B, which are simplified pictorial illustrations of still another example of the use of the system for enabling efficient management of project-wise permissions, constructed and operative in accordance with a preferred embodiment of the present invention. This system is preferably suitable for operating in an hierarchical access permissions environment including multiple network objects, and includes functionality for maintaining project-wise lists of network objects, access permissions to which cannot be managed together via a hierarchical folder structure, and functionality for employing the project-wise lists of network objects to make project-wise changes in access permissions to the network objects without the need to individually access individual ones of the network objects.

As shown in FIG. 6A, there is provided a project management system which typically resides on a server 600 that is connected to an enterprise-wide network 602. Network 602 preferably includes multiple disparate clients 604, file servers 606 and email servers 607. Each of file servers 606 preferably hosts a hierarchical folder structure 608 of folders and files. Each of email servers 607 preferably hosts a plurality of mailboxes and mailing lists 610.

The project management system residing on server 600 preferably comprises a projects repository 620 which contains a plurality of project-wise lists of links to network objects. In the example of FIG. 6A, projects repository 620 includes a list of HR related links 622, a list of legal related links 624 and a list of finance related links 626. Each of lists 622, 624 and 626 preferably comprises links 630 which reference actual folders 632 residing in any of hierarchical folder structures 608 hosted on file servers 606. Additionally, each of lists 622, 624 and 626 preferably comprises links 634 which reference actual mailboxes and mailing lists 610 residing in any of email servers 607.

It is a particular feature of this embodiment of the present invention that although actual folders 632 and mailboxes and mailing lists 610 referenced in each of lists 622, 624 and 626 may each reside in any of hierarchical folder structures 608 hosted on disparate file servers 606 and on disparate email servers 607 respectively, each of lists 622, 624 and 626 may be employed to make changes in access permissions to actual folders 632 and mailboxes and mailing lists 610 referenced by links thereof without the need to individually access individual ones of actual folders 632 and mailboxes and mailing lists 610.

In the example of FIG. 6A, on a particular date such as Jan. 5, 2011, an HR manager of a company introduces Frank, a new employee of the HR department, to the IT manager of the company, and requests that the IT manager grant Frank access permissions to all HR files and HR mailing lists in the organization. In response to the request made by the HR manager, the IT manager utilizes the project management system residing on server 600 to grant Frank permissions to the list of HR related links 622, thereby granting Frank permissions to the portion of actual folders 632 and mailboxes and mailing lists 610 which are HR related.

Turning now to FIG. 6B, it is shown that on a later date, such as on Jan. 6, 2011, Frank attempts to access an HR related email item 650. Upon entering suitable identification credentials, Frank is granted access to the HR related email item 650.

Figure 7:
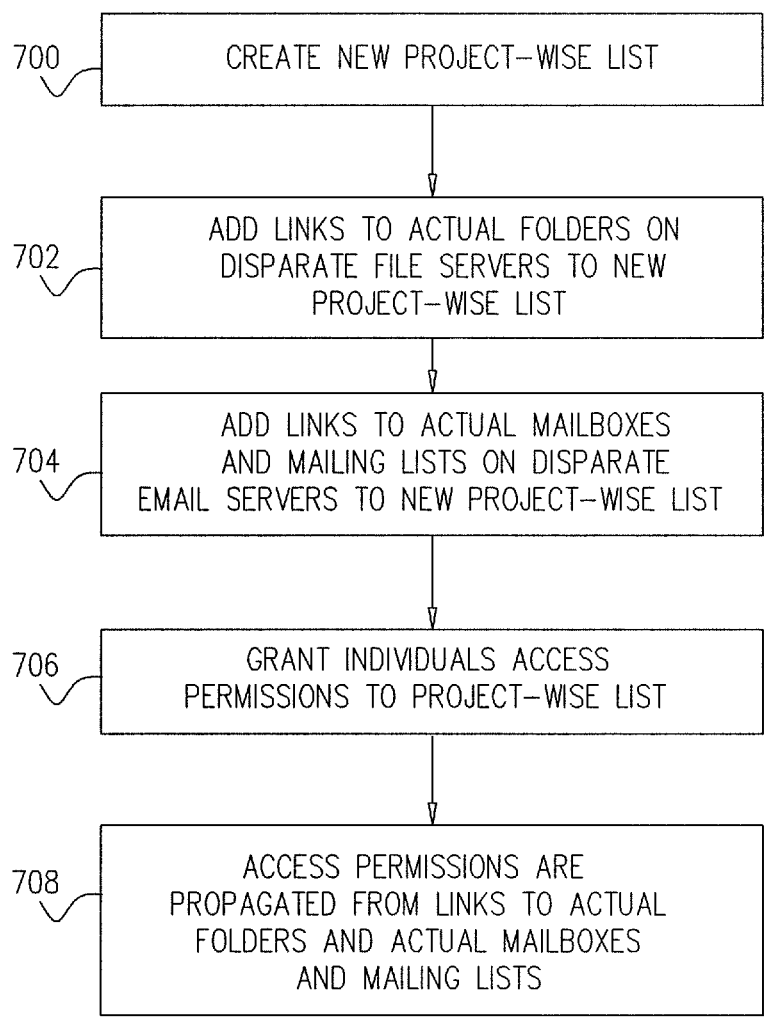
FIG. 7 is a simplified flowchart indicating steps in the operation of the system of FIGS. 6A and 6B.

Reference is now made to FIG. 7, which is a simplified flowchart indicating steps in the operation of the system of FIGS. 6A and 6B. The example of FIG. 7 illustrates the use of the project management system in modifying access permissions to folders, mailboxes and mailing lists residing on disparate file servers and email servers without the need to individually access individual ones of the folders, mailboxes and mailing lists.

As shown in FIG. 7, initially, a new project-wise list is created (700). Preferably, an owner of the new project-wise list then adds links to actual folders which preferably reside on disparate file servers to the new project-wise list (702). Preferably, the owner of the new project-wise list also adds links to actual mailboxes and mailing lists which preferably reside on disparate email servers to the new project-wise list (704). The owner can then grant access permissions to the new project-wise list to individuals (706). The access permissions granted to the new project-wise list are then propagated by the system to actual folders, mailboxes and mailing lists via the links (708), thereby granting actual access permissions to the actual folders to the individuals.

Figure 8A:
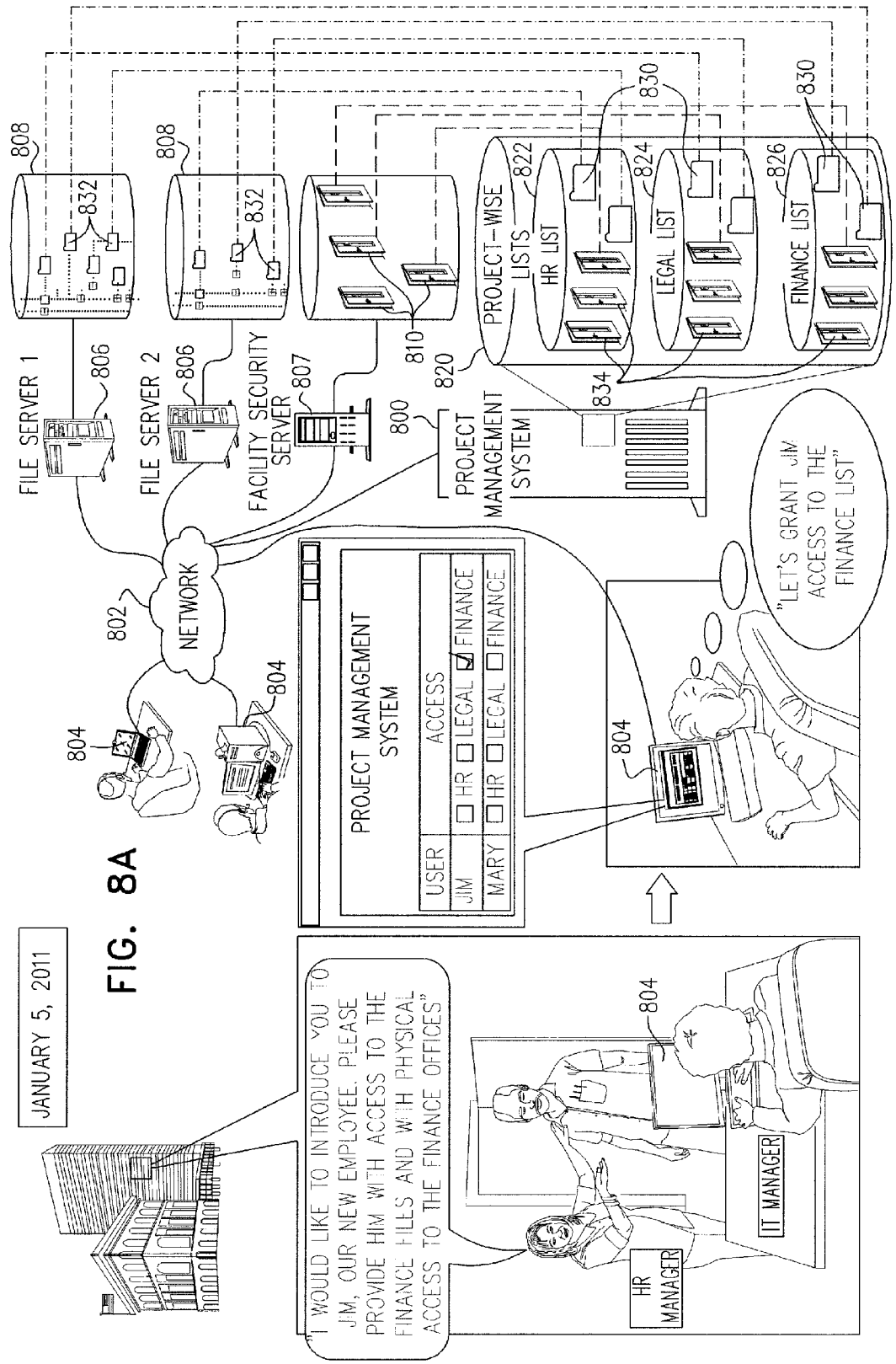

Reference is now made to FIGS. 8A and 8B, which are simplified pictorial illustrations of still another example of the use of the system for enabling efficient management of project-wise permissions, constructed and operative in accordance with a preferred embodiment of the present invention. This system is preferably suitable for operating in an hierarchical access permissions environment including multiple network objects, and includes functionality for maintaining project-wise lists of network objects, access permissions to which cannot be managed together via a hierarchical folder structure, and functionality for employing the project-wise lists of network objects to make project-wise changes in access permissions to the network objects without the need to individually access individual ones of the network objects.

As shown in FIG. 8A, there is provided a project management system which typically resides on a server 800 that is connected to an enterprise-wide network 802. Network 802 preferably includes multiple disparate clients 804, file servers 806 and a facility security server 807. Each of file servers 806 preferably hosts a hierarchical folder structure 808 of folders and files. Facility security server 807 preferably controls physical access to various areas of a facility by controlling the opening and closing of doorways throughout the facility via a plurality of doorway access permissions records 810.

The project management system residing on server 800 preferably comprises a projects repository 820 which contains a plurality of project-wise lists of links to network objects. In the example of FIG. 8A, projects repository 820 includes a list of HR related links 822, a list of legal related links 824 and a list of finance related links 826. Each of lists 822, 824 and 826 preferably comprises links 830 which reference actual folders 832 residing in any of hierarchical folder structures 808 hosted on file servers 806. Additionally, each of lists 822, 824 and 826 preferably comprises links 834 which reference doorway access permissions records 810 residing on facility security server 807.

It is a particular feature of this embodiment of the present invention that although actual folders 832 and doorway access permissions records 810 referenced in each of lists 822, 824 and 826 may each reside in any of hierarchical folder structures 808 hosted on disparate file servers 806 and on facility security server 807 respectively, each of lists 822, 824 and 826 may be employed to make changes in access permissions to actual folders 832 and in doorway access permissions records 810 referenced by links thereof without the need to individually access individual ones of actual folders 832 and doorway access permissions records 810.

In the example of FIG. 8A, on a particular date such as Jan. 5, 2011, an HR manager of a company introduces Jim, a new employee of the finance department, to the IT manager of the company, and requests that the IT manager grant Jim access permissions to all finance files and access to the finance offices located within the company's facility. In response to the request made by the HR manager, the IT manager utilizes the project management system residing on server 800 to grant Jim permissions to the finance list 822, thereby granting Frank permissions to the portion of actual folders 832 which are finance related and access to the finance offices located within the company's facility.

Turning now to FIG. 8B, it is shown that on a later date, such as on Jan. 6, 2011, Jim attempts to open a doorway 850 to an area in the facility which is restricted to individuals with access permissions to the finance department. Upon entering suitable identification credentials such as an access card 852, Jim is granted access to doorway 850.

Figure 9:
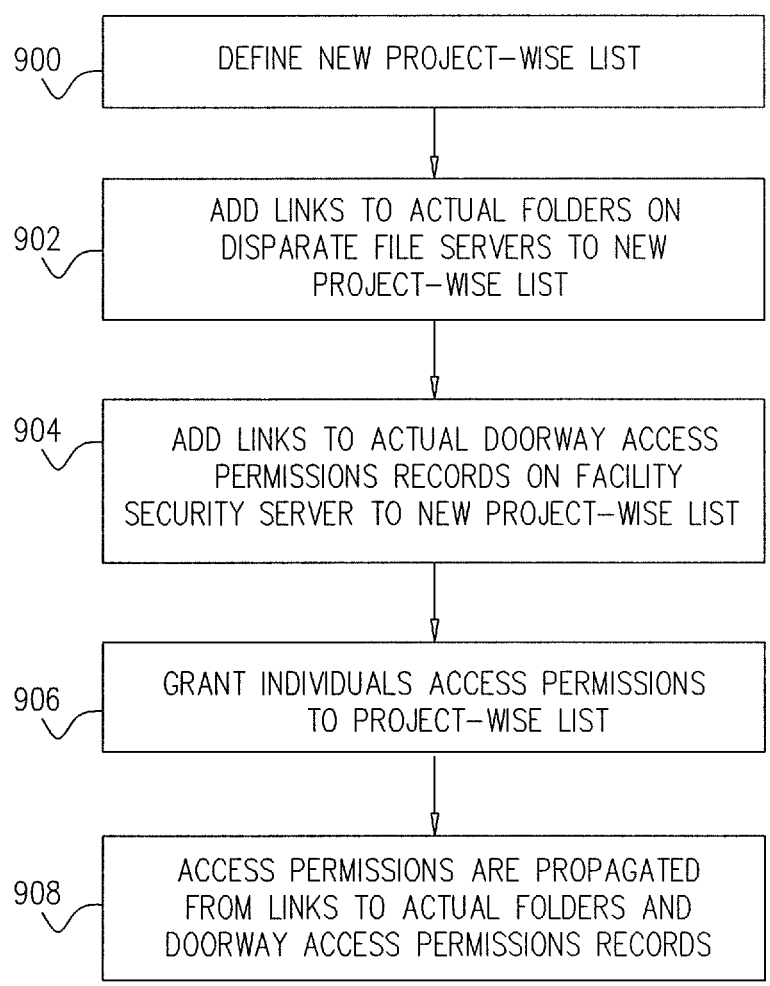
FIG. 9 is a simplified flowchart indicating steps in the operation of the system of FIGS. 8A and 8B.

Reference is now made to FIG. 9, which is a simplified flowchart indicating steps in the operation of the system of FIGS. 8A and 8B. The example of FIG. 9 illustrates the use of the project management system in modifying access permissions to folders and to various physical areas of a facility.

As shown in FIG. 9, initially, a new project-wise list is created (900). Preferably, an owner of the new project-wise list then adds links to actual folders which preferably reside on disparate file servers to the new project-wise list (902). Preferably, the owner of the new project-wise list also adds links to actual doorway access permissions records which preferably reside on a facility security server to the new project-wise list (904). The owner can then grant access permissions to the new project-wise list to individuals (906). The access permissions granted to the new project-wise list are then propagated by the system to actual folders and doorway access permissions records via the links (908), thereby granting actual access permissions to the actual folders to the individuals.

It will be appreciated by persons skilled in the art that the present invention is not limited by what has been particularly shown and described hereinabove. Rather the scope of the present invention includes both combinations and sub-combinations of the various features described hereinabove as well as modifications thereof which would occur to persons skilled in the art upon reading the foregoing description and which are not in the prior art.

The invention claimed is:

1. In a hierarchical access permissions environment, a method for enabling efficient management of project-wise permissions, the method comprising using at least one processor and at least one memory comprising computer code for:
   maintaining project-wise lists of unstructured network objects, access permissions to which cannot be managed together via either a hierarchical folder structure or a single unstructured network object, wherein
      each of the unstructured network objects being distinctly different from one another and being represented by a link corresponding to at least one structured object stored on a disparate computing system;
      the access permissions to the unstructured network objects not being extracted by an unstructured network object from another unstructured network object;
   employing the project-wise lists of the unstructured network objects to make project-wise changes in the access permissions to the unstructured network objects without the need to individually modify access permissions to individual ones of the unstructured network objects; and
   in response to the changes being made in the unstructured network objects, propagating the changes to at least one structured object stored on the disparate computing system.

2. The method according to claim 1, wherein the maintaining project-wise lists of the unstructured network objects comprises generating at least one project-wise list of plural ones of the unstructured network objects.

3. The method according to claim 2, wherein the maintaining project-wise lists of the unstructured network objects also comprises mapping access permissions of the plural ones of the unstructured network objects onto the at least one project-wise list.

4. The method according to claim 1, wherein the maintaining project-wise lists of the unstructured network objects also comprises merging access permissions of plural ones of first unstructured network objects of a first project-wise list with access permissions of corresponding plural ones of second unstructured network objects of a second project-wise list.

5. The according to claim 1, wherein the unstructured network objects are stored on disparate computers.

6. The method according to claim 5, wherein at least some of the disparate computers are operated by different computer operating systems.

7. The method according to claim 1, wherein the unstructured network objects comprise inter-related subject matter.

8. The method according to claim 1 and wherein the unstructured network objects are owned by a common owner.

9. In a hierarchical access permissions environment, a project management system including a non-transitory, tangible computer-readable medium in which computer program instructions are stored, which instructions, when read by a computer, cause the computer to enable efficient management of project-wise permissions, the system comprising:
   a project-wise lists management (PWLM) subsystem maintaining project-wise lists of unstructured network objects, access permissions to which cannot be managed together via either a hierarchical folder structure or a single unstructured network object, wherein
   each of the unstructured network objects being distinctly different from one another and being represented by a link corresponding to at least one structured object stored on a disparate computing system;
   the access permissions to the unstructured network objects not being extracted by an unstructured network object from another unstructured network object; and
   a user interface allowing an owner of a project-wise list of the unstructured network objects to make project-wise changes in the access permissions to the unstructured network objects without the need to individually modify access permissions to individual ones of the unstructured network objects; and
   in response to the changes being made in the unstructured network objects, propagating the changes to at least one structured object stored on the disparate computing system.

10. The project management system according to claim 9, wherein the project-wise lists management (PWLM) subsystems comprises:
   a project-wise list generator which generates at least one project-wise list of plural ones of the unstructured network objects.

11. The project management system according to claim 10, wherein the project-wise lists management (PWLM) subsystem also comprises:
   an access permissions mapping generator which maps access permissions of the plural ones of the unstructured network objects onto the at least one project-wise list.

12. The project management system according to claim 9, wherein the project-wise lists management (PWLM) subsystem also comprises:
   project-wise lists merging functionality which is operative to merge access permissions of plural ones of first unstructured network objects of a first project-wise list with access permissions of corresponding plural ones of second unstructured network objects of a second project-wise list.

13. The project management system according to claim 9, wherein the unstructured network objects are stored on disparate computers.

14. The project management system according to claim 13, wherein at least some of the disparate computers are operated by different computer operating systems.

15. The project management system according to claim 9, wherein the unstructured network objects comprise inter-related subject matter.

16. The project management system according to claim 9 and wherein the unstructured network objects are owned by a common owner.

* * * * *